United States Patent [19]

Clark

[11] Patent Number: 4,553,097

[45] Date of Patent: Nov. 12, 1985

[54] WELL LOGGING APPARATUS AND METHOD USING TRANSVERSE MAGNETIC MODE

[75] Inventor: Brian Clark, Ridgefield, Conn.

[73] Assignee: Schlumberger Technology Corporation, New York, N.Y.

[21] Appl. No.: 430,571

[22] Filed: Sep. 30, 1982

[51] Int. Cl.[4] .......................... G01V 3/30; G01F 9/30
[52] U.S. Cl. .................................... 324/338; 324/342
[58] Field of Search ............... 324/334, 343, 337–341, 324/360, 342, 345, 346; 343/719, 895

[56] References Cited

U.S. PATENT DOCUMENTS

| | | | |
|---|---|---|---|
| 2,220,070 | 11/1940 | Aiken . | |
| 2,333,883 | 11/1943 | Piety | 324/242 X |
| 2,455,940 | 12/1948 | Muskat et al. | |
| 3,305,771 | 2/1967 | Arps . | |
| 3,408,561 | 10/1968 | Redwine et al. . | |
| 3,449,657 | 6/1969 | Fredriksson et al. | 324/338 |
| 3,551,797 | 12/1970 | Gouilloud et al. | 324/338 |
| 3,582,766 | 6/1971 | Iizuka | 324/338 |
| 3,629,937 | 12/1971 | Fredriksson et al. | 343/719 X |
| 3,646,562 | 2/1972 | Acker et al. | 343/895 X |
| 3,849,721 | 11/1974 | Calvert | 324/338 |
| 4,209,747 | 6/1980 | Huchital | 324/338 |
| 4,312,003 | 1/1982 | Robbins, Jr. | 343/719 X |
| 4,334,227 | 6/1982 | Marks | 343/719 |
| 4,348,672 | 9/1982 | Giuler . | |
| 4,458,248 | 3/1984 | Lyasko | 343/719 |

FOREIGN PATENT DOCUMENTS

| | | | |
|---|---|---|---|
| 1040261 | 10/1978 | Canada | 324/341 |
| 2146126 | 4/1985 | United Kingdom . | |
| 177558 | 2/1966 | U.S.S.R. . | |

OTHER PUBLICATIONS

Jackson, "Classical Electrodynamics", Wiley & Sons, Inc., 1978, pp. 242–243.
Marcuvitz, "Waveguide Handbook", Dover Publications, Inc., ©1965, pp. 2–7 and 72–77.
Stratton, "Electromagnetic Theory", McGraw-Hill Book Co., Inc., 1941, pp. 524–531.
Wait et al, "Transmission Line Theory . . . Borehole", Applied Physics, Apr. 2, 1973, vol. 1, pp. 311–316.

*Primary Examiner*—Gerard R. Strecker
*Assistant Examiner*—Warren S. Edmonds
*Attorney, Agent, or Firm*—Stephen L. Borst; Martin M. Novack

[57] ABSTRACT

A well logging apparatus and method is disclosed which can be used as a wireline logging device or technique, and is also suitable for being employed in a logging-while-drilling device. Electromagnetic energy having primarily a transverse magnetic mode component is guided along a tubular conductor in a borehole, and measurements of the transverse magnetic mode component can be used to obtain the conductivity and/or dielectric constant of formations surrounding the borehole.

54 Claims, 6 Drawing Figures

WELL LOGGING APPARATUS AND METHOD USING TRANSVERSE MAGNETIC MODE

BACKGROUND OF THE INVENTION

This invention relates to borehole logging devices of the type wherein electromagnetic energy is used for measuring properties of formations surrounding a borehole and, more particularly, to a logging apparatus and method that can be used in either wireline logging applications or logging-while-drilling applications.

In recent years, logging systems have been proposed for employing radio frequency electromagnetic energy in the range between about 10 MHz and 100 MHz to determine both the dielectric constant and the conductivity of formations surrounding a borehole. In this frequency range, dielectric constant and conductivity both have a substantial effect upon the propagation constant of electromagnetic energy propagating in the formations, so measurements of attenuation and phase can be used for solution of simultaneous equations to determine the dielectric constant and/or conductivity of formations through which the electromagnetic energy has passed. A device of this type is the deep propagation tool ("DPT"), an embodiment of which is described in U.S. Pat. No. 4,209,747. This device includes a transmitting antenna, a "close" receiver antenna pair, and a "far" receiver antenna pair. Each of the transmitter and receiver antennas are coils wound in insulating media mounted on a metal cylindrical pipe which carries wiring to and/or from the coils. The coils are wound around the central axis of the pipe. Briefly, operation of the DPT logging device involves energizing the transmitter to emit electromagnetic energy at a frequency suitable for determination of both the electrical conductivity and the electrical permittivity of the surrounding formations. A portion of the electromagnetic energy which has traveled through the formations is received at the close and far differential receiver pairs. The signals detected at the far receiver pair are used to determine the phase shift of electromagnetic energy that has passed through the formations, and the signals detected at the close receiver pair are used to determine relative attenuation of the electromagnetic energy. The phase shift and attenuation are then employed to obtain electrical permittivity and electrical conductivity of the formations.

Various techniques of logging have been proposed for use in logging-while-drilling systems. In the U.S. Pat. Nos. 3,305,771 and 3,408,561 there is disclosed a well logging technique for determining formation conductivity (or resistivity) by employing toroidal solenoid antennas to launch a low frequency (e.g. 500 Hertz) current in a conductive sub on which the antennas are mounted. In one version of the technique, the logging device is urged against the borehole wall so that a current can flow in the device between the antennas and then through the formations and back into the device. In another version, contact electrodes extend outwardly from the device and contact the borehole wall in order to provide current paths to and from the formations. In a further form of that device wherein logging-while-drilling is effected, the described current loop passes through the metal sub which now forms part of the drill string, and then through the drill bit, the formations, and then back into the drill string. In each case, the receiving antenna or antennas measure the amount of current that flows in a loop that includes the conductive body or body portion of the logging device, and the formations. The referenced type of logging devices are advantageous in that they can be employed in logging-while-drilling applications as well as in conventional wireline logging. However, the need to establish a current loop that includes the formations, such as by making direct contact with the formations, can be problematic. Also, the frequency of the electrical energy employed is necessarily limiting on the nature of the measurement and the type of information that can be obtained.

It is among the objects of the present invention to provide a logging device which can be employed as a wireline tool or as a logging-while-drilling measurement tool. It is a further object of the invention to provide a device that is capable of electromagnetic logging at frequencies that are useful for measurement of conductivity and/or dielectric constant of subsurface formations. It is another object of the invention to provide a logging device that is capable of operating over a range of different frequencies so as to permit measurement of properties of formations at different depths of investigation.

SUMMARY OF THE INVENTION

The present invention is directed to a logging apparatus and method that can be used as a wireline logging device or technique and is also well suited for being employed in a logging-while-drilling device that is attached downhole in line with a drill string, typically just above the drill bit.

In accordance with an embodiment of the invention, there is provided apparatus for investigating properties of earth formations surrounding a borehole, including a logging device moveable through the borehole. The logging device preferably includes a sturdy generally cylindrical body formed of an electrically conductive material, such as metal pipe. In the logging-while-drilling embodiment, this pipe is part of the drill string. An energizing means is provided. A transmitting antenna means, which, in the embodiments hereof, is a toroidal solenoid antenna recessed in an annular slot in the body, is coupled to the energizing means and is provided to generate electromagnetic energy having primarily a transverse magnetic mode component. Receiving antenna means, comprising at least one, and preferably two or more toroidal solenoid antennas recessed in the device body, are provided for receiving the transmitted electromagnetic energy, the receiver antenna means having primarily sensitivity to transverse magnetic mode components of the received signal.

In the preferred embodiment of the invention, means are provided for processing the signals received at the receiver antenna means to obtain properties of the earth formations which affected the propagation of the transmitted electromagnetic energy. In particular, the processing means is operative, inter alia, to determine the conductivity and/or dielectric constant of the surrounding formations.

In contrast to the types of electromagnetic logging devices which utilize a wave that diverges in all directions from a transmitter, the present invention exploits electromagnetic energy that is guided along the borehole. The guiding of the energy is provided by the conductive body of the logging device. In some cases, the device body, mud-filled borehole, and external formation act as a generally cylindrical waveguide structure similar to a coaxial transmission line. The lowest order waveguide mode travels, in either the single conductor or coaxial model, with much less attenuation than any other mode. It is an axially symmetric, transverse magnetic mode ($TM_{oo}$), which has no low frequency cut-off. When the formation conductivity $\sigma_t$ is less than the mud conductivity $\sigma_m$, the velocity and attenuation of the $TM_{oo}$ mode is very close to the velocity and attenuation of a plane wave propagating in the formation. In this case, the attenuation of the mode is fairly insensitive to the diameter of the borehole and the conductivity and dielectric constant of the mud. Accordingly, the present device is well suited for measurement of the formation conductivity and dielectric constant, especially in situations where water-based muds are employed.

In a form of the present invention, means are provided for varying the frequency of operation of the logging apparatus by controlling the operating frequency of the energizing means. The frequency can be controlled while the device is downhole. An advantage of utilizing a logging device that employs the transverse magnetic mode component of the electromagnetic signal is that this mode does not readily cut off or greatly attenuate over the relatively wide range of operating frequencies. By varying the operating frequency, and therefore the skin depth of the generated electromagnetic energy, the effective depth of investigation of the device can be varied either during a given logging run or as between different logging runs. Also, variation of frequency can be used to change the relative degree to which the electromagnetic energy is sensitive to the conductivity and dielectric constant of the formations.

Further features and advantages of the invention will become more readily apparent from the following detailed description when taken in conjunction with the accompanying drawings.

DESCRIPTION OF THE PREFERRED EMBODIMENT

Figure 1:
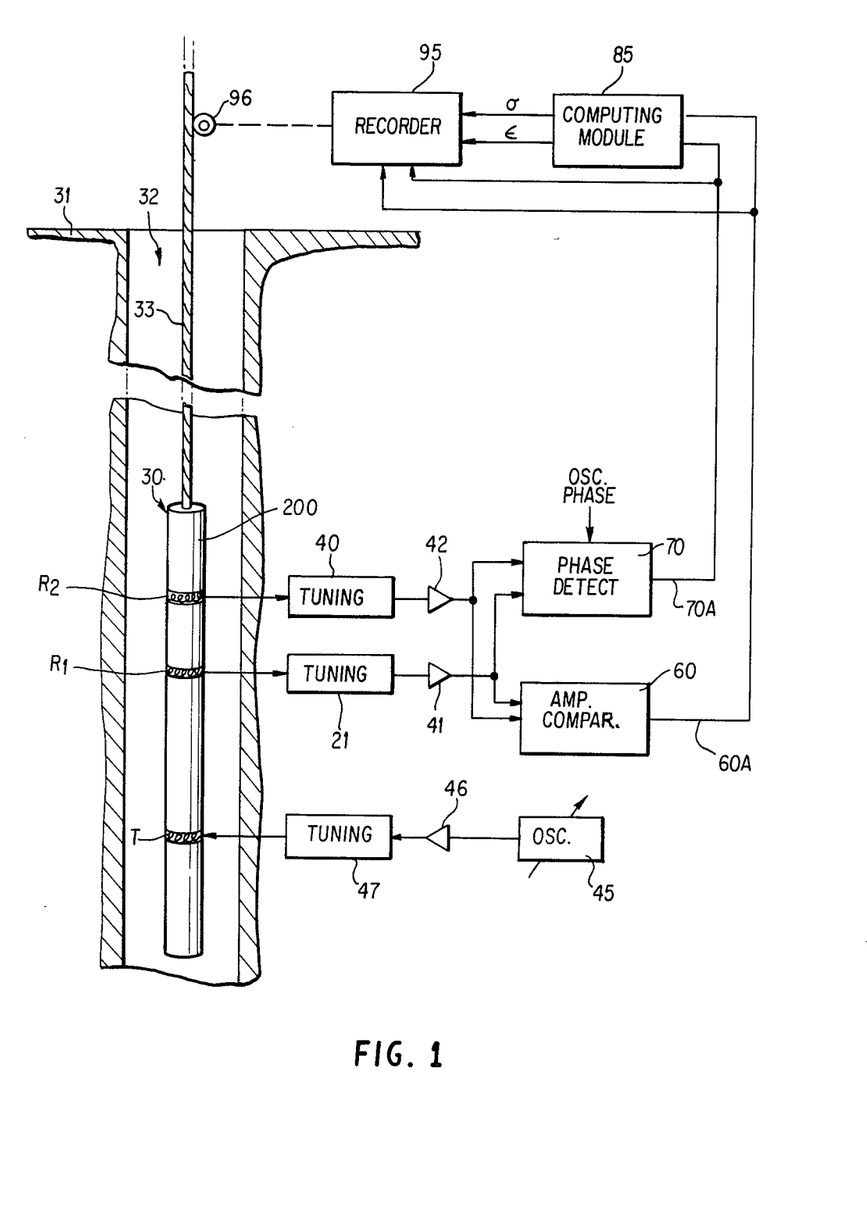
FIG. 1 is a block diagram of an apparatus in accordance with an embodiment of the invention.

Referring to FIG. 1, there is shown an embodiment of an apparatus in accordance with the invention, and which can be used for practising the method of the invention, for investigating subsurface formations 31 traversed by a borehole 32. The borehole 32 is preferably filled with a water-based drilling mud. The borehole may be open or cased with a nonconductive material. The investigating apparatus or logging device 30 is suspended in the borehole 32 on an armored cable 33, the length of which substantially determines the relative depth of the device 30. The cable length is controlled by suitable means at the surface such as a drum and winch mechanism (not shown). The armored cable 33 is rewound on the drum to raise the device 30 toward the surface as formation characteristics are measured. Depth measurements are provided by a measure wheel 96 which is rotated as a result of contact with cable 33. Pulses provided by rotation of measure wheel 96 are applied to a recorder 95 to provide a record of the depths at which measurements are being taken.

The logging device 30 includes a tubular electrically conductive support/guiding member 200 which may be formed of a conductive metal. Mounted in member 200 are a transmitter antenna T, a close receiver antenna $R_1$, and a far receiver coil $R_2$. In the present embodiment each of the antennas comprises a toroidal solenoid which is preferably recessed into an annular slot in the member 200. The antennas are electrically isolated and protected by encasing them in an insulating dielectric material, for example, that fills the slot. The tubular member 200 carries wires to and/or from the antennas and may also contain electronic components of the logging device. Alternatively, a separate cartridge may be provided for this purpose. The member 200 helps prevent interference at the antennas from the wires or components therein, but its primary purpose herein is as a guiding vehicle for the transverse magnetic mode components of the electromagnetic wave energy.

A variable frequency oscillator module 45 can operate in the present embodiment in the range between about 10 KHz and 100 MHz, (and preferably in the range 10 MHz to 30 MHz). The output of the oscillator is coupled to the transmitter T through an amplifier 46 and tuning circuit 47. The toroidal solenoid transmitting antenna T, in conjunction with the guiding member 200 produces electromagnetic energy having primarily transverse magnetic mode components. The toroidal solenoid receiving antennas $R_1$ and $R_2$ have primary sensitivity to the transverse magnetic mode components of the received signal.

The outputs of receivers $R_1$ and $R_2$ are applied, through tuning circuits 21 and 22, respectively, and amplifiers 41 and 42, respectively, to an amplitude comparator 60 and a phase detector circuit 70. The output of phase detector 70 is a signal level which is proportional to the phase difference $\phi$ between the signals received at $R_1$ and $R_2$. The output of amplitude comparator 60 is a signal level which is proportional to the amplitude ratio of the signals received at $R_2$ and $R_1$.

Figure 2:
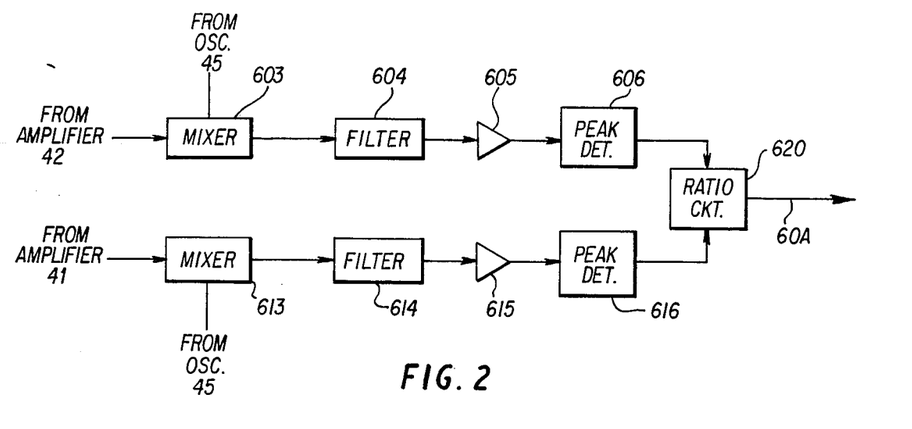
FIG. 2 is a block diagram of an embodiment of the amplitude comparator 60 of FIG. 1.

FIG. 2 discloses an embodiment of the amplitude comparator circuit 60. To simplify the process of amplitude detection, the outputs of amplifiers 41 and 42 are coupled to mixer circuits 603 and 613, respectively, which receive as their other inputs a signal at a frequency related to the transmitter oscillator frequency, typically at a frequency above or below the transmitter frequency by a radio frequency. The mixing of the two signals produces, in each case, an output signal having an amplitude and phase related to the amplitude and phase of the signal detected at a respective receiver, but at the radio frequency. The outputs of mixers 603 and 613 are filtered by band pass filters 604 and 614 and then coupled, by IF stage amplifiers 605 and 615 to peak detectors 606 and 616, respectively. The peak detectors provide output signals representative of the wave envelopes. The outputs of the peak detectors are coupled to a ratio circuit 620 which generates the signal on line 60A (FIG. 1) that is representative of the amplitude ratio of the wave energy received at $R_2$ and $R_1$.

Figure 3:
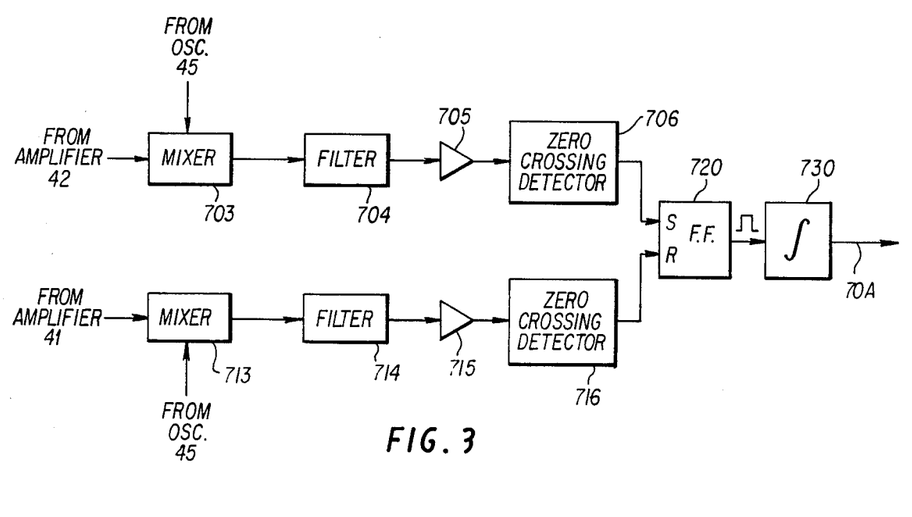
FIG. 3 is a block diagram of an embodiment of the phase detector 70 of FIG. 1.

FIG. 3 discloses an embodiment of the phase comparator circuit 70 of FIG. 1. In a manner similar to FIG. 2, the outputs of amplifiers 41 and 42 are coupled to mixers 703 and 713, respectively, whose outputs are, in turn, coupled to filter 704 and amplifier 705 and filter 714 and amplifier 715, respectively. The outputs of amplifiers 705 and 715 are respectively coupled to zero crossing detectors 707 and 716. The output of zero crossing detector 706 is coupled to the set terminal of a flip-flop 720, and the output of the zero crossing detector 716 is coupled to the reset terminal of the flip-flop 720. The zero crossing detectors are operative to generate an output only for excursions through zero in the positive-going direction. Accordingly, during each cycle the energy arriving first at receiver $R_1$ will result in an output of zero crossing detector 706 which, in turn, sets the flip-flop 720. When the signal subsequently arrives at receiver $R_2$, the resultant output of zero crossing detector 716 will reset the flip-flop 720. Accordingly, the output of flip-flop 720 is a pulse having a duration which represents the phase difference between the two signals. The output of flip-flop 720 is coupled to an integrator 730 whose output is the signal 70A; i.e, an analog signal representative of the phase difference as between the signals received at receivers $R_2$ and $R_1$. It will be understood that the advantageous noise-eliminating technique described in the Calvert U.S. Pat. No. 3,849,721, with or without borehole compensation techniques, can be employed, if desired. If borehole compensation is utilized, a second transmitter can be located on the opposite side of the receivers, and the receiver pairs can be adapted to alternately reverse roles as the transmitters are switched. Alternatively, one could, if desired, employ a time-processed borehole-compensation technique.

The outputs of the phase detector circuit 70 and the amplitude comparison circuit 60 are transmitted to the surface over the conductors 60A and 70A which in actuality pass through the armored cable 33. Typically, these signals may be digitized before transmission to the surface. At the surface of the earth the signals on lines 53A and 53B are applied to a computing module 85 which computes values of conductivity and dielectric constant. These values are recorded by recorder 95.

For initial understanding of the theory of operation, consider a simplified model of metal tube of radius a embedded in a homogeneous medium of conductivity $\sigma$, magnetic permeability $\mu_o$ (for non-magnetic media) and relative dielectric constant $\epsilon'$. As is well known, the metal tube will allow a transverse magnetic field mode to propagate along the direction of the tube (see e.g. *Electromagnetic Theory*, Stratton, McGraw Hill, 1941). As is shown in Stratton, if the metal tube has a much higher conductivity than the homogeneous medium, the principle TM mode propagates according to the characteristics of the external medium.

Assume that the principle TM mode has been excited, for example, by a toroidal solenoid transmitter. The signal detected by a toroidal receiver placed at a location Z along the metal tube will be $$V(Z,t) = V_o e^{i(hZ - \omega t)} \tag{1}$$

where $V_o$ is a constant which depends upon the efficiencies of the receiver and transmitter, t is time, where $\omega$ is the angular frequency, and h is the propagation constant of the principle TM mode. For a near-receiver located at $Z_N$, and a far receiver located at $Z_F$, receivers will measure the voltages $V_N$ and $V_F$, respectively, as follows:

$$V_N = V(Z_N,t) = V_o e^{i(hZ_N - \omega t)} \tag{2}$$

$$V_F = V(Z_F,t) = V_o e^{i(hZ_F - \omega t)} \tag{3}$$

(Hereinafter, the $e^{-i\omega t}$ term will be understood to be included.) The propagation constant, h, has real and imaginary parts $$h = h' + ih'' \tag{4}$$

so that $$V_N = V_o e^{i(h'Z_N) - h''Z_N} \tag{5}$$

$$V_F = V_o e^{i(h'Z_F) - h''Z_F} \tag{6}$$

The amplitudes of the signals in the near and far receivers are $$|V_N| = |V_o| e^{-h''Z_N} \tag{7}$$

$$|V_F| = |V_o| e^{-h''Z_F} \tag{8}$$

so that a ratio of the amplitudes at the near and far receivers yields $$|V_N|/|V_F| = e^{h''(Z_F - Z_N)} \tag{9}$$

The imaginary part of h (h'') is given by $$h'' = (Z_F - Z_N)^{-1} \ln(|V_N/V_F|) \tag{10}$$

The phase at the near and far receivers is given by $$\theta_N = h'Z_N \tag{11}$$

$$\theta_F = h'Z_F \tag{12}$$

where $\theta_N$ and $\theta_F$ are in radians. The phase difference between the near and far receivers is given by $$\theta_F - \theta_N = h'(Z_F - Z_N) \tag{13}$$

so that the real part of h (h') is given by $$h' = (Z_F - Z_N)^{-1}(\theta_F - \theta_N) \tag{14}$$

Thus, a measurement of the phase difference and a measurement of the amplitude ratio between the near and far receivers yields the real and imaginary parts of h.

If the conductivity of the metal tube is much larger than the conductivity of the homogeneous medium, the propagation constant (see e.g. Stratton) of the principle TM mode is given by $$h = \frac{\omega}{c} \sqrt{\epsilon' + i \frac{\sigma}{\epsilon_o \omega}} = h' + ih'' \tag{15}$$

where c is the speed of light in a vacuum ($3 \times 10^8$ m/sec) and $\epsilon_o$ is the permittivity of vacuum ($8.854 \times 10^{-12}$ farads/m). Manipulating algebraically gives:

$$\epsilon' = \frac{c^2}{\omega^2}[(h')^2 - (h'')^2] \tag{16}$$

$$\sigma = 2\frac{c^2}{\omega} \epsilon_o h' h'' \tag{17}$$

Accordingly, $\epsilon'$ and $\sigma$ could be determined, in this simplified model, from the near and far amplitudes and phases using relationships (10), (14), (16) and (17).

Consider next a model which includes a borehole. In this case, there will still be a principle Transverse Magnetic field mode, but its propagation constant will not be given exactly by relationship (15). The relationships used to determine the complex components of h would still be valid. However, the relationship (16) and (17) may involve some error in determining $\epsilon'$ and $\sigma$ from h. Accordingly, in the present model, let the borehole fluid medium have a radius b, with relative dielectric constant $\epsilon_b'$ and conductivity $\sigma_b$. The solution for the propagation constant h, given a, b, $\epsilon_b'$, $\sigma_b$, $\epsilon'$, and $\sigma$, is known (see Wait and Fuller, "Transmission Line Theory for an Insulated Linear Antenna in a Fluid or Air-Filled Borehole", *Applied Physics*, Volume 1, 1973). In Wait et al, the problem of an insulated metal tube in a borehole in a formation is presented, and a method for obtaining h is set forth. For the purposes hereof, the metal tube is uninsulated. Therefore, the solution derived in the reference can be modified for our purposes if the insulating region is eliminated from the analysis.

Adapting the analysis from this reference, a method for obtaining h (when a, b, $\epsilon_b'$, $\sigma_b$, $\epsilon'$, and $\sigma$ are known) is by solving $$h^2 = k^2 \left( \frac{\ln[\gamma^2/4(k^2 - h^2)b^2] - \ln(b/a)^2}{\ln[\gamma^2/4(k^2 - h^2)b^2] - k^2/k_b^2 \ln(b/a)^2} \right) \quad (18)$$

where $$k^2 = \frac{\omega^2}{c^2}\left(\epsilon' + i\frac{\sigma}{\epsilon_0\omega}\right),$$

$$k_b^2 = \frac{\omega^2}{c^2}\left(\epsilon_b' + \frac{\sigma_b}{\epsilon_0\omega}\right),$$

$$\gamma^2/4 = .793054\ldots$$

Various techniques, well known in the art, could be employed to obtain and record $\epsilon'$ and/or $\sigma$ from the measured values and the relationships set forth, either at the well logging site or at a remote location. For example, a small general purpose digital computer can be used as computing module 85 and a look-up table technique can be employed to obtain values of the conductivity and electric permitivity from the measured values of attenuation and phase. Briefly, the procedure is as follows: A look-up table is compiled for a particular set of given conditions of angular frequency $\omega$, tool radius a, borehole radius b, borehole mud conductivity $\sigma_b$ and borehole mud dielectric constant $\epsilon_b'$. Given these conditions, relationship (18) can be used to establish the look-up table by selecting pairs of values of $\sigma$ and $\epsilon'$, and using relationships (16) and (17) to obtain a pair of values h' and h", that satisfy the relationship (18). The procedure is then repeated, at suitable increments, for all pairs of $\sigma$ and $\epsilon'$ within the ranges of interest, storing in the table each corresponding pair of values h', h". To use the look-up table, when values of attenuation and phase are measured, and relationships (10) and (14) are utilized to obtain values of h" and h', respectively. The look-up table can then be entered, the closest corresponding pair of values h', h" is located, and the corresponding pair of values for $\sigma$ and $\epsilon'$ are read out as the determined conductivity and dielectric constant of the investigated formations. These values can then be recorded on recorder 95 (FIG. 1).

Figure 4:
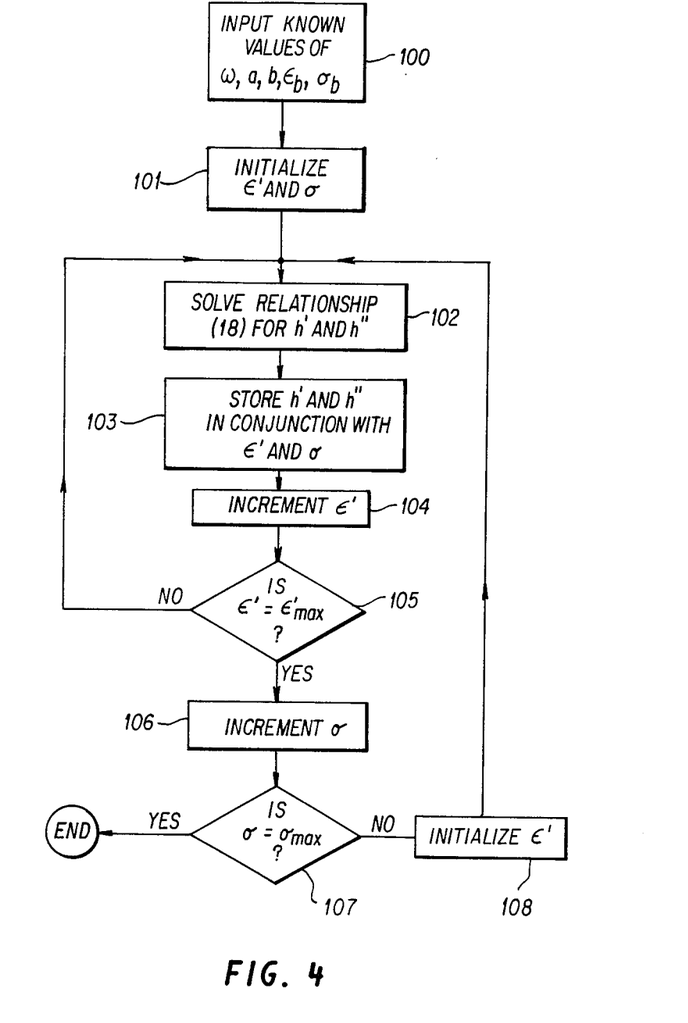
FIG. 4 is a flow diagram of the routine for generating a look-up table that can be used to obtain formation conductivity and/or dielectric constant.

A simplified flow chart for programming the computing module 85 to store the table of values is shown in FIG. 4. The values of $\omega$, a, b, $\sigma_b$, and $\epsilon_b$ to be used are input, as represented by block 100. Initial values of $\epsilon'$ and $\sigma$ are selected, as indicated by the block 101. These values could typically be the lowest possible expected values of $\epsilon'$ and $\sigma$. Block 102 is then entered and represents the function of solving relationship (18), e.g. numerically, for h' and h". The current values of $\epsilon'$ and $\sigma$ are then stored in conjunction with the calculated values of h' and h", as represented by the block 103. The value of $\epsilon'$ is then incremented, as represented by the block 104. $\epsilon'$ is then tested (diamond 105) to determine if it has reached the maximum value of $\epsilon'$ to be used. If not, block 102 is reentered, and new values are stored in the table. When $\epsilon'$ has been incremented over its full range, the answer to the inquiry of diamond 105 will be "yes" and block 106 is entered, this block representing the incrementing of $\sigma$. $\sigma$ is then tested (diamond 107) to determine if it has reached the maximum value of $\sigma$ to be utilized. If not, $\epsilon'$ is again initialized, block 102 is again entered and, as previously described, a new set of values will be determined as $\epsilon'$ is iterated over its full range for this new value of $\sigma$. This procedure will continue until $\sigma$ has reached its maximum value whereupon the routine is over and the full table of values has been stored.

Figure 5:
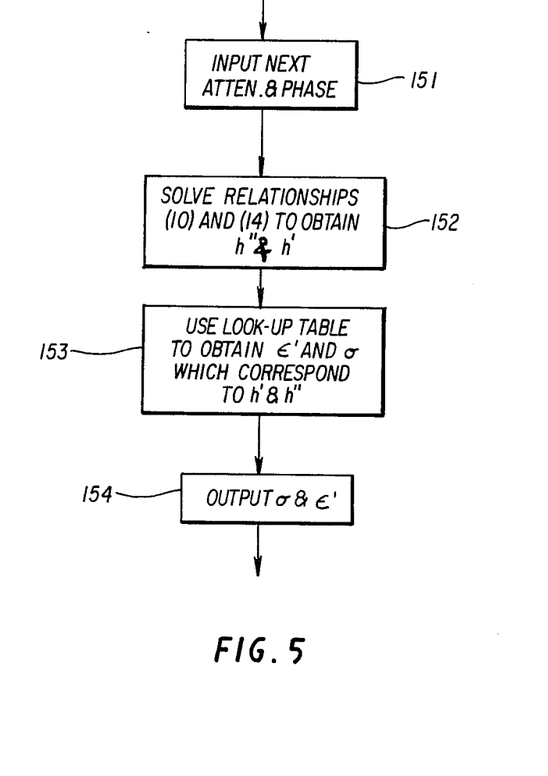
FIG. 5 is a flow diagram of the routine for using the look-up table.

FIG. 5 is a simplified flow chart which illustrates how the look up table can be used. The measured attenuation and phase are input (block 151), and relationships (10) and (14) are solved (block 152) to obtain values of h" and h', respectively. The previously stored look-up table can then be entered (block 153) to obtain the $\epsilon'$ and $\sigma$ which are stored in conjunction with the closest pair h', h". The values of $\epsilon'$ and $\sigma$ are then read out (block 154), such as for recording, display, and/or transmission. Sets of look-up tables (or graphs derived therefrom, which can be used in similar manner), can be generated for various types of common conditions, or can be generated after conditions are set or measured.

Alternatives to the table look-up technique would be a curve matching technique or direct iterative numerical solution of the relationships set forth. A further possible approach is to provide a special purpose analog or digial computer which provides output functions that simulate families of curves which represent the relationships set forth. It will also be recognized that by using the described logging device in suitably large test pit borehole, stored values can be obtained empirically.

Figure 6:
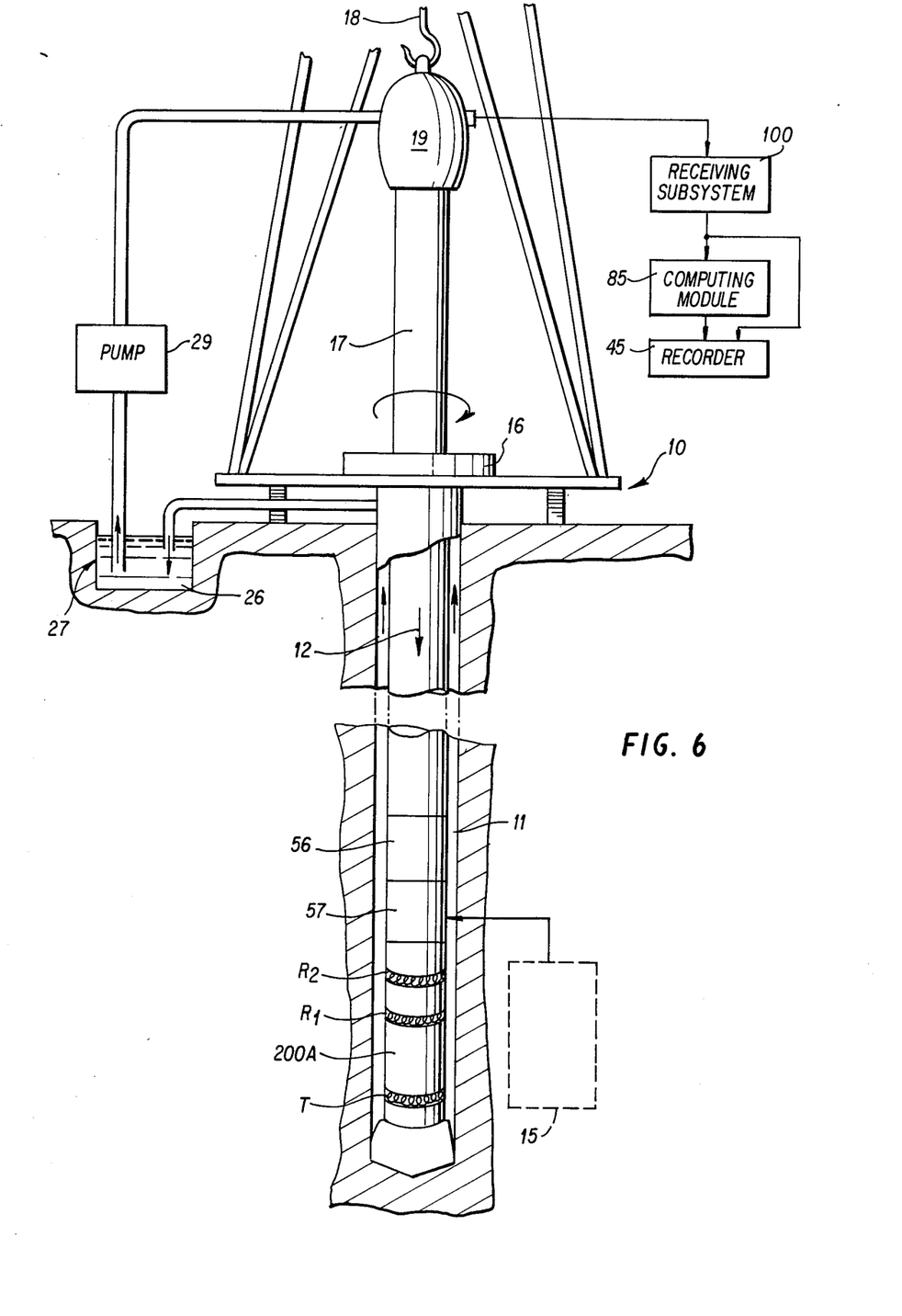
FIG. 6 illustrates a logging-while-drilling system that employs the invention.

Referring to FIG. 6, there is illustrated an embodiment of the invention in the form of a logging-while-drilling apparatus and method. A platform and derrick 10 are positioned over a borehole 11 that is formed in the earth by rotary drilling. A drill string 12 is suspended within the borehole and includes a drill bit 15 at its lower end. The drill string 12, and the drill 15 attached thereto, is rotated by a rotating table 16 (energized by means not shown) which engages a kelly 17 at the upper end of the drill string. The drill string is suspended from a hook 18 attached to a travelling block (not shown). The kelly is connected to the hook through a rotary swivel 19 which permits rotation of the drill string relative to the hook. Drilling fluid or mud 26 is contained in a pit 27 in the earth. A pump 29 pumps the drilling fluid into the drill string via a port in the swivel 19 to flow downward through the center of drill string 12. The drilling fluid exits the drill string via ports in the drill bit 15 and then circulates upward in the region between the outside of the drill string and the periphery of the borehole. As is well known, the drilling fluid thereby carries formation cuttings to the surface of the earth, and the drilling fluid is returned to the pit 27 for recirculation. The small arrows in the FIGURE illustrate the typical direction of flow of the drilling fluid.

Mounted within the drill string 12, preferably near the drill bit 15, is a downhole sensing and transmitting subsystem 250. Subsystem 250 includes a measuring apparatus 200A which includes antennas T, $R_1$, and $R_2$, and operates in the manner described in conjunction with FIG. 1 or the other embodiments hereof. A transmitting portion of the downhole subsystem includes an acoustic transmitter 56 which generates an acoustic signal in the drilling fluid that is representative of the measured downhole conditions. One suitable type of acoustic transmitter, which is known in the art, employs a device known as a "mud siren" which includes a slotted stator and a slotted rotor that rotates and repeatedly interrupts the flow of drilling fluid to establish a desired acoustic wave signal in the drilling fluid. Transmitter 56 is controlled by transmitter control and driving electronics 57 which includes analog-to-digital (A/D) circuitry that converts the signals representative of downhole conditions into digital form. The control and driving electronics 57 also includes a phase shift keying (PSK) modulator which conventionally produces driving signals for application to the transmitter 56. The electronics 250 is representative of processing electronics, such as are used in FIG. 1 to produce the signals on conductors 60A and 70A. These signals are coupled to the transmitter control and driving electronics 57 which applies appropriate modulation to the mud siren of transmitter 56.

The generated acoustic mud wave travels upward in the fluid through the center of the drill string at the speed of sound in the fluid. The acoustic wave is received at the surface of the earth, by transducers represented by reference numeral 31. The transducers, which may for example be piezoelectric transducers, convert the received acoustic signals to electronic signals. The output of the transducers 31 is coupled to the uphole receiving subsystem 100 which is operative to demodulate the transmitted signals, which are then coupled to computing module 85 and recorder 95.

It will be understood that alternative techniques can be employed for communicating logging information from device 200A to the surface of the earth.

The invention has been described with reference to particular preferred embodiments, but variations within the spirit and scope of the invention will occur to those skilled in the art. For example, while two receivers and a single transmitter are shown in the illustrated embodiments, it will be understood that three or more receivers and/or two or more transmitters could be employed. Also, the operating frequency could be varied, uphole or downhole, and before or during a logging run. Finally, while toroidal solenoid antennas are presently preferred, electric dipole type antennas, designed to yield substantial TM mode, could alternatively be employed.

I claim:

1. Apparatus for investigating properties of earth formations surrounding a borehole, comprising:
   a logging device moveable through the borehole, said device including a generally tubular electrically conductive body portion;
   energizing means;
   transmitting antenna means, mounted on said logging device and coupled to said energizing means, for generating electromagnetic energy, in the frequency range between about 10 kilohertz and 100 megahertz, guided by said conductive body portion and having primarily transverse magnetic mode components with respect to said conductive body portion, a portion of said energy passing through said formations;
   receiving antenna means, mounted on said logging device in spaced relation to said transmitting antenna means, for receiving the transmitted electromagnetic energy, said receiving antenna means being adapted to have primarily sensitivity to the transverse magnetic mode components of electromagnetic energy, the received signal being indicative of properties of said formations.

2. Apparatus as defined by claim 1, further comprising means coupled to said receiving means for determining the conductivity or permittivity of said surrounding earth formations as a function of the output of said receiver means.

3. Apparatus as defined by claim 1, wherein said transmitting antenna means and said receiving antenna means comprise toroidal solenoid antennas.

4. Apparatus as defined by claim 2, wherein said transmitting antenna means and said receiving antenna means comprise toroidal solenoid antennas.

5. Apparatus as defined by claim 3, wherein said toroidal solenoid antennas are recessed in generally annular slots in said logging device.

6. Apparatus as defined by claim 4, wherein said toroidal solenoid antennas are recessed in generally annular slots in said logging device.

7. Apparatus as defined by claim 1, wherein said transmitting antenna means comprises a toroidal solenoid antenna and said receiver antennas means comprises a pair of spaced toroidal solenoid antennas.

8. Apparatus as defined by claim 2, wherein said transmitting antenna means comprises a toroidal solenoid antenna and said receiver antenna means comprises a pair of spaced toroidal solenoid antennas.

9. Apparatus as defined by claim 1, wherein said energizing means includes means for varying the frequency of the energizing signal applied to said transmitting antenna means.

10. Apparatus as defined by claim 2, wherein said energizing means includes means for varying the frequency of the energizing signal applied to said transmitting antenna means.

11. Apparatus as defined by claim 3, wherein said energizing means includes means for varying the frequency of the energizing signal applied to said transmitting antenna means.

12. Apparatus as defined by claim 6, wherein said energizing means includes means for varying the frequency of the energizing signal applied to said transmitting antenna means.

13. Apparatus as defined by claim 8, wherein said energizing means includes means for varying the frequency of the energizing signal applied to said transmitting antenna means.

14. Apparatus as defined by claim 1, wherein said energizing means is operative in the frequency range of about 10 megahertz to 30 megahertz.

15. Apparatus as defined by claim 2, wherein said energizing means is operative in the frequency range of about 10 megahertz to 30 megahertz.

16. Apparatus as defined by claim 4, wherein said energizing means is operative in the frequency range of about 10 megahertz to 30 megahertz.

17. Apparatus as defined by claim 8, wherein said energizing means is operative in the frequency range of about 10 megahertz to 30 megahertz.

18. Apparatus as defined by claim 9, wherein said energizing means is operative in the frequency range of about 10 megahertz to 30 megahertz.

19. Apparatus as defined by claim 1, wherein the conductive surface of said conductive body portion is an exposed surface which is in contact with the borehole environment.

20. For use in conjunction with an earth borehole drilling system, a measurement-while-drilling logging apparatus for investigating properties of earth formations surrounding a borehole, comprising:
   an electrically conductive generally cylindrical tubular body mountable downhole on the drill string of said drilling system;
   energizing means;
   transmitting antenna means, recessed in said body and coupled to said energizing means, for generating electromagnetic energy in the frequency range between about 10 kilohertz and 100 megahertz, guided by said conductive body and having primarily transverse magnetic mode components with respect to said conductive body, a portion of said energy passing through said formations;
   receiving antenna means, recessed in said body in spaced relation to said transmitting antenna means, for receiving the transmitted electromagnetic energy, said receiving antenna means being adapted to have primarily sensitivity to the transverse magnetic mode components of electromagnetic energy; and
   means for communicating signals derived from said receiving antenna means to the surface of the earth, said signals being indicative of properties of said formations.

21. Apparatus as defined by claim 20, wherein the conductive surface of said conductive body is an exposed surface which is in contact with the borehole environment.

22. Apparatus as defined by claim 20, further comprising means coupled to said receiving means for determining the conductivity or permittivity of said surrounding earth formations as a function of the output of said receiver means.

23. Apparatus as defined by claim 20, wherein said transmitting antenna means and said receiving antenna means comprise toroidal solenoid antennas.

24. Apparatus as defined by claim 22, wherein said transmitting antenna means and said receiving antenna means comprise toroidal solenoid antennas.

25. Apparatus as defined by claim 20, wherein said transmitting antenna means comprises a toroidal solenoid antenna and said receiver antenna means comprises a pair of spaced toroidal solenoid antennas, each recessed in said body.

26. Apparatus as defined by claim 22, wherein said transmitting antenna means comprises a toroidal solenoid antenna and said receiver antenna means comprises a pair of spaced toroidal solenoid antennas, each recessed in said body.

27. Apparatus as defined by claim 20, wherein said energizing means includes means for varying the frequency of the energizing signal applied to said transmitting antenna means.

28. Apparatus as defined by claim 22, wherein said energizing means includes means for varying the frequency of the energizing signal applied to said transmitting antenna means.

29. Apparatus as defined by claim 23, wherein said energizing means includes means for varying the frequency of the energizing signal applied to said transmitting antenna means.

30. Apparatus as defined by claim 25, wherein said energizing means includes means for varying the frequency of the energizing signal applied to said transmitting antenna means.

31. Apparatus as defined by claim 26, wherein said energizing means includes means for varying the frequency of the energizing signal applied to said transmitting antenna means.

32. Apparatus as defined by claim 20, wherein said energizing means is operative in the frequency range of about 10 megahertz to 30 megahertz.

33. Apparatus as defined by claim 22, wherein said energizing means is operative in the frequency range of about 10 megahertz to 30 megahertz.

34. Apparatus as defined by claim 28, wherein said energizing means is operative in the frequency range of about 10 megahertz to 30 megahertz.

35. A method for investigating properties of earth formations surrounding a borehole, comprising the steps of:
   providing a generally tubular electrically conductive body in the borehole;
   generating, at a transmitter location on said body, electromagnetic energy in the frequency range between about 10 kilohertz and 100 megahertz, having primarily transverse magnetic mode components with respect to said body and which are guided by said body, a portion of said energy passing through said formations;
   receiving the transverse magnetic mode components of the electromagnetic energy at a receiver location on the body; and
   determining a property of the surrounding earth formations as a function of the received transverse magnetic mode components.

36. The method as defined by claim 35, wherein the step of determining a property of the surrounding earth formations comprises determining the conductivity or permittivity of said surrounding earth formations as a function of the amplitude and phase of the received energy.

37. The method as defined by claim 35, wherein said receiving step comprises receiving said energy at a pair of spaced receivers within the receiver location.

38. The method as defined by claim 36, wherein said receiving step comprises receiving said energy at a pair of spaced receivers within the receiver location.

39. The method as defined by claim 35, wherein the frequency of the transmitted energy is in the range of about 10 megahertz to 30 megahertz.

40. The method as defined by claim 36, wherein the frequency of the transmitted energy is in the range of about 10 megahertz to 30 megahertz.

41. The method as defined by claim 38, wherein the frequency of the transmitted energy is in the range of about 10 megahertz to 30 megahertz.

42. The method as defined by claim 36, wherein the transmitted energy is variable in frequency.

43. The method as defined by claim 38, wherein the transmitted energy is variable in frequency.

44. The method as defined by claim 35, wherein said conductive body is moved through the borehole, with said body having an exposed conductive surface which contacts the borehole environment.

45. For use in conjunction with an earth borehole drilling system, a measurement-while-drilling logging method for investigating properties of earth formations surrounding a borehole, comprising the steps of:
   providing a generally tubular electrically conductive body as part of the drill string of the drilling system;
   generating, at a transmitter location on said body, electromagnetic energy in the frequency range between about 10 kilohertz and 100 megahertz, having primarily transverse magnetic mode components with respect to said body and which are guided by said body, a portion of said energy passing through said formations;
   receiving the transverse magnetic mode components of the electromagnetic energy at a receiver location on the body; and
   communicating signals, which depend on the received energy, to the surface of the earth, said signals being indicative of properties of said formations.

46. The method as defined by claim 45, further comprising the step of determining the conductivity or permittivity of said surrounding earth formations as a function of the amplitude and phase of the received energy.

47. The method as defined by claim 45, wherein said receiving step comprises receiving said energy at a pair of spaced receivers within the receiver location.

48. The method as defined by claim 46, wherein said receiving step comprises receiving said energy at a pair of spaced receivers within the receiver location.

49. The method as defined by claim 45, wherein the frequency of the transmitted energy is in the range of about 10 megahertz to 30 megahertz.

50. The method as defined by claim 46, wherein the frequency of the transmitted energy is in the range of about 10 megahertz to 30 megahertz.

51. The method as defined by claim 48, wherein the frequency of the transmitted energy is in the range of about 10 megahertz to 30 megahertz.

52. The method as defined by claim 46, wherein the transmitted energy is variable in frequency.

53. The method as defined by claim 48, wherein the transmitted energy is variable in frequency.

54. The method as defined by claim 45, wherein said conductive body is moved through the borehole, with said conductive body having an exposed conductive surface which contacts the borehole environment.

* * * * *